United States Patent [19]

Yeh et al.

[11] Patent Number: 5,659,634

[45] Date of Patent: Aug. 19, 1997

[54] APPARATUS AND METHOD FOR ENCODING AND RECONSTRUCTING IMAGE DATA

[75] Inventors: Thomas I. Yeh, Penfield; Francis K. Tse, Rochester; Anthony M. Frumusa, Penfield; Aron Nacman, Rochester; Kenneth D. Romano, Webster, all of N.Y.

[73] Assignee: Xerox Corporation, Stamford, Conn.

[21] Appl. No.: 315,275

[22] Filed: Sep. 29, 1994

[51] Int. Cl.⁶ .................................................. G06K 9/36
[52] U.S. Cl. .......................... 382/232; 382/233; 382/235; 382/245; 358/261.1; 358/426
[58] Field of Search ..................... 358/406, 426, 358/261.1; 348/797; 370/13, 55, 84; 382/56, 232, 233, 235, 245

[56] References Cited

U.S. PATENT DOCUMENTS

| | | | |
|---|---|---|---|
| 3,597,071 | 8/1971 | Jones | 355/3 |
| 4,124,870 | 11/1978 | Schatz et al. | 358/260 |
| 4,558,370 | 12/1985 | Mitchell et al. | 382/56 |
| 4,675,733 | 6/1987 | Tanimoto | 358/261.1 |
| 4,742,550 | 5/1988 | Felte | 381/36 |
| 4,821,107 | 4/1989 | Naito et al. | 358/256 |
| 4,847,677 | 7/1989 | Music et al. | 382/56 |
| 5,021,892 | 6/1991 | Kita et al. | 358/468 |
| 5,047,955 | 9/1991 | Shope et al. | 364/519 |
| 5,056,154 | 10/1991 | Aono et al. | 382/56 |
| 5,109,437 | 4/1992 | Honda | 382/56 |
| 5,170,340 | 12/1992 | Prokop et al. | 364/143 |
| 5,175,633 | 12/1992 | Saito et al. | 358/406 |
| 5,223,948 | 6/1993 | Sakurai et al. | 358/404 |
| 5,237,316 | 8/1993 | Cox, Jr. et al. | 382/56 |
| 5,276,799 | 1/1994 | Rivshin | 395/162 |
| 5,301,262 | 4/1994 | Kashiwagi | 395/117 |
| 5,305,159 | 4/1994 | Sakai et al. | 360/77.02 |
| 5,307,458 | 4/1994 | Freiburg et al. | 395/162 |
| 5,457,487 | 10/1995 | Frank | 345/158 |

FOREIGN PATENT DOCUMENTS

| | | | |
|---|---|---|---|
| 1090005A1 | 5/1984 | European Pat. Off. | H04N 1/40 |
| 220568A2 | 5/1987 | European Pat. Off. | H04N 1/40 |
| 1531401 | 11/1978 | United Kingdom | B41L 19/00 |
| WO81/02206 | 8/1981 | WIPO | G03F 1/00 |

*Primary Examiner*—Jose L. Couso
*Assistant Examiner*—Anh Hong Do
*Attorney, Agent, or Firm*—Gary B. Cohen

[57] ABSTRACT

An apparatus for processing an input image, represented by an input bit stream including a plurality of first bit sets, is provided. The apparatus includes a device for processing the input bit stream in such a manner that each of the first bit sets is represented by a second bit set with each of the second bit sets having less bits than each of the first bit sets and a selected number of bits in the input bit stream, corresponding to image-related information, being discarded as a result of the encoding. The apparatus is provided with an electronic volatile memory for storing a resulting encoded bit stream and a bit stream analyzer for analyzing the stored encoded bit stream to generate positional signals. The apparatus is further provided with a reconstruction circuit for reconstructing the stored encoded bit stream, by reference to the positional signals. The reconstruction circuit operates in such a manner that, upon outputting an image representation of the reconstructed bit stream, the outputted image includes at least a part of the discarded, image-related information.

18 Claims, 13 Drawing Sheets

| Left Neighbor Pixel | Present Pixel | Right Neighbor Pixel | POSITION | VALUE |
|---|---|---|---|---|
| W | | W | L | 1 |
| W | | G1 | R | 0 |
| W | | G2 | R | 0 |
| W | | B | R | 0 |
| G1 | | W | L | 1 |
| G1 | | G1 | R | 0 |
| G1 | | G2 | R | 0 |
| G1 | | B | R | 0 |
| G2 | | W | L | 1 |
| G2 | | G1 | L | 1 |
| G2 | | G2 | L | 1 |
| G2 | | B | R | 0 |
| B | | W | L | 1 |
| B | | G1 | L | 1 |
| B | | G2 | L | 1 |
| B | | B | R | 0 |

FIG. 13

$SEL0 = \overline{AOR} \cdot COR + BOR$
$SEL1 = AOR + BOR$

APPARATUS AND METHOD FOR ENCODING AND RECONSTRUCTING IMAGE DATA

The present invention relates generally to a technique for both storing and outputting image data in a printing system and, more particularly, to an apparatus and method in which image data, from an input image, is discarded, during an encoding process, and a resulting encoded bitstream is reconstructed in a manner which serves to replenish a substantial amount of the discarded image data and minimize degradation of an output representation of the input image.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the IIT from, among other sources, a network or a scanner. An example of an IIT with both network and scanner inputs is found in the following patent, the pertinent potions of which are incorporated herein by reference:

U.S. Pat. No. 5,170,340

Patentees: Prokop et al.

Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in the following patent:

U.S. Pat. No. 5,047,955

Patentees: Shope et al.

Issued: Sep. 10, 1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality" continues to grow. As illustrated by the following patent, a multifunctional digital copier can assume the form of an arrangement in which a single electrostatic processing printer is coupled with a plurality of different image input devices, with such devices being adapted to produce image related information for use by the printer.

U.S. Pat. No. 3,957,071

Patentee: Jones

Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:

U.S. Pat. No. 4,821,107

Patentees: Naito et al.

Issued: Apr. 11, 1989

U.S. Pat. No. 5,021,892

Patentees: Kita et al.

Issued: Jun. 4, 1991

U.S. Pat. No. 5,175,633

Patentees: Saito et al.

Issued: Dec. 29, 1992

U.S. Pat. No. 5,223,948

Patentees: Sakurai et al.

Issued: Jun. 29, 1993

U.S. Pat. No. 5,276,799

Patentee: Rivshin

Jan. 4, 1994

U.S. Pat. No. 5,307,458

Patentees: Freiburg et al.

Issued: Apr. 26, 1994

U.S. Pat. No. 4,821,107 discloses a multifunctional image apparatus which is operable in one of various office automation modes, such as copy mode, facsimile mode, printer mode and the like. The multifunctional imaging apparatus is comprised of an image reading section, an image forming section and a communication section for transmitting and receiving image data.

U.S. Pat. Nos. 5,175,633 and 5,307,458, respectively, disclose systems that exploit a coprocessor to access, among others, facsimile and communication functions. In the latter of these patents, a plurality of input/output devices reside on a common bus with a video processor, with the video processor using an electronic precollation scheme. In the '458 patent, a first set of image data is processed in the video processor while a second set of image data is buffered in the coprocessor. An arbiter permits the coprocessor to have the bus, for a selected interval, to process the second set of image data in the video processor.

U.S. Pat. No. 5,276,799 discloses a multi-bus printing system in which multiple tasks can be performed at any one moment in time. More particularly, a group of intelligent modules is in communication with a CBus, DBus and VBus, respectively, while a CPU processing module is in communication with the CBus and a DMA processing module is in communication with the DBus. One feature of this multi-bus printing system is that it provides a high level of concurrency. For example, in one embodiment, three separate sets of data can be substantially concurrently transferred across the CBus, DBus and VBus.

Digital copiers typically seek to optimize concurrency and/or multi-tasking in operation. Xerox' DocuTech® optimizes multitasking by using a plurality of processors to operate individual services, such as scanning, printing, storing and decomposing, simultaneously. Accordingly, in one example, a document can be scanned while another document is being printed. Even though this sort of multitasking is desirable, it requires a substantial amount of both processing capability and storage space. A printing system, with an architecture of substantially smaller scale than DocuTech®, may be found in the following patent:

British Patent 1,531,401

Patentees: Davy et al.

Publication Date of Complete Specification: Nov. 8, 1976 British Patent 1,531,401 discloses a system with a bus to which an input section, precollation memory and an output section are operatively coupled. Each of the input section and the output section includes a set of buffers and a direct memory access (DMA) interface. One DMA interface serves to transfer a first set of buffered data from one of the input buffers to the precollation memory while another DMA interface serves to transfer a second set of data from the precollation memory to one of the output buffers. Another patent that uses an architectural concept similar to that of the '401 British patent can be found in the following reference:

U.S. Pat. No. 5,301,262

Patentee: Kashiwagi

Issued: Apr. 5, 1994

The '262 patent, in contrast to the '401 British patent, compresses image data, prior to storing it in a page buffer, and decompresses the image data, prior to outputting it.

It is known that output of an image can be enhanced significantly through use of a high addressability output device. For example, through employment of a printing machine with a capability of storing or buffering scanned data prepared at a resolution of 600×3 spi, a corresponding output of 1800×1 spi can be obtained. While this sort of output is desirable, storing image data at 600×3 spi, even for short time periods, can be burdensome on a printing machine with relatively limited volatile or system memory, such as some of the digital printing systems discussed above. While various ones of the above printing systems advantageously exploit disk storage, in conjunction with system memory, it is, for purposes of outputting a job, necessary to store or buffer the job in system memory. Moreover, even in a digital printing machine which takes advantage of disk, storage of an image is achieved, commonly, by "funneling" the image through the system memory on its way to disk. Such funneling process can "clog" up system memory readily when the image is relatively complex. It would be desirable to store or buffer a job in system memory of a high addressability printing machine, at a first resolution, and output it at a second resolution where the first resolution is significantly less than the second resolution.

In one example, storing or buffering a job at less than 600×3 spi is accomplished by discarding image-related information, i.e. image data. This discarding of image data can lead to a degradation of image quality when reproducing the remaining image data. It would be desirable to provide a technique in which at least a part of the discarded image data could be reconstructed so that image degradation is minimized.

In accordance with the disclosed embodiment of the present invention there is provided an apparatus for processing an input image represented by image data, the image data assuming a form of an input bit stream, the input bit stream including a plurality of first bit sets, comprising: a device for processing the input bit stream in such a manner that each of the first bit sets is represented by a second bit set, each of the second bit sets having less bits than each of the first bit sets, a selected number of bits in the input bit stream, corresponding to image-related information, being discarded as a result of the encoding; electronic volatile memory for storing a resulting encoded bit stream, wherein memory space, in the electronic volatile memory is saved as a result of reducing a size of each of the first bit sets; a bit stream analyzer for analyzing the stored encoded bit stream to generate positional signals; a reconstruction circuit for reconstructing the stored encoded bit stream, by reference to the positional signals, so as to convert the second bit sets to third bit sets, the third bit sets being substantially similar to the first bit sets; and an output device for outputting an image representation of the reconstructed bit stream, the outputted image including at least a part of the discarded, image-related information.

These and other aspects of the invention will become apparent from the following description, the description being used to illustrate a preferred embodiment of the invention when read in conjunction with the accompanying drawings.

FIG. 13 is a schematic representation of the contents of a look-up table of FIG. 12;

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
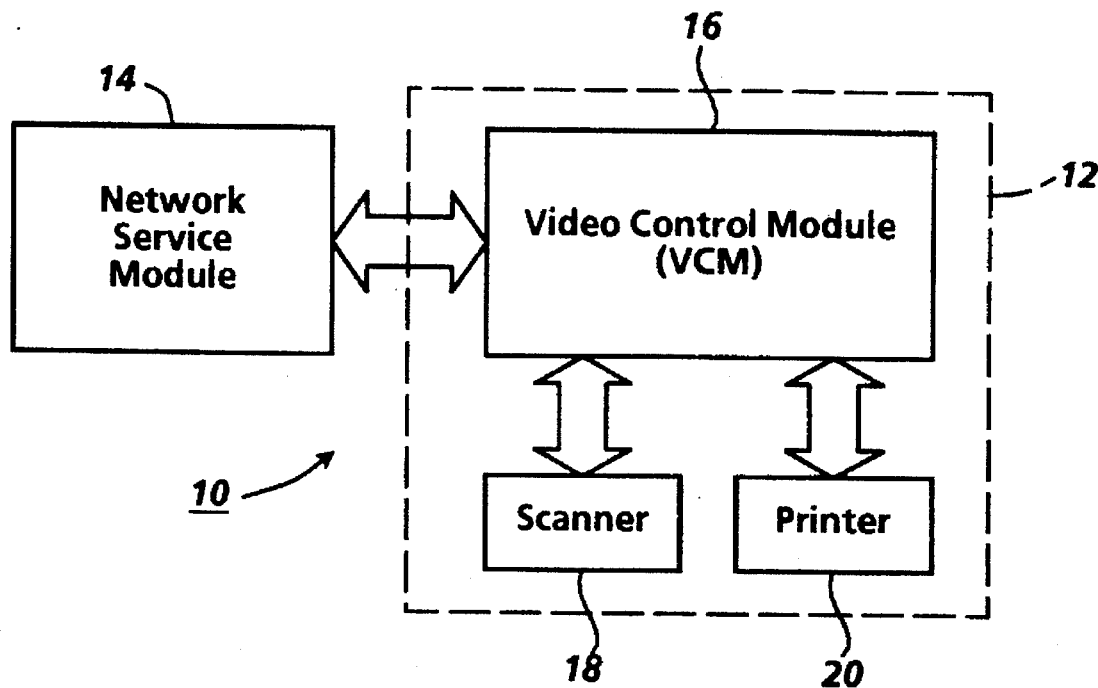
FIG. 1 is a block diagram depicting a multifunctional, network adaptive printing machine.

Referring to FIG. 1, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 2), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 1, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 2:
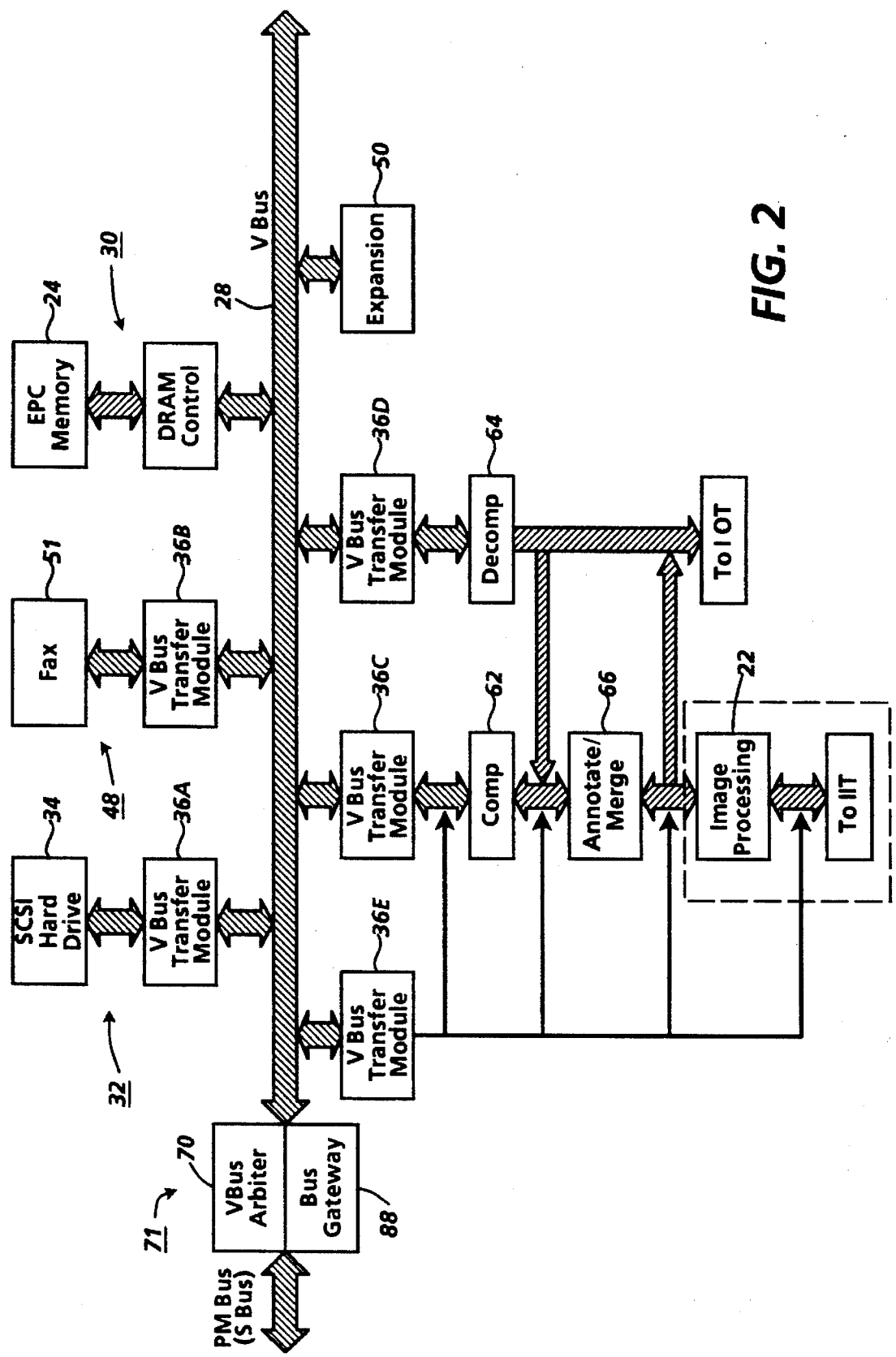
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 3:
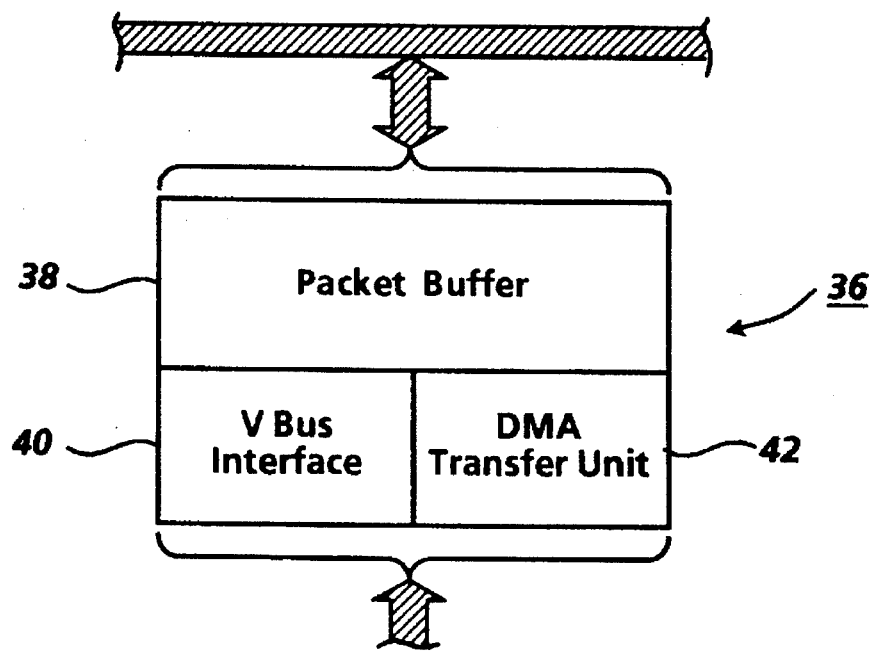
FIG. 3 is a block diagram of a transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can programmed to handle packets of up to 64 Bytes Preferably, the packet size would be reduced for times when the VBus is relatively busy and increased for times when activity on the bus is relatively low.

Figure 5:
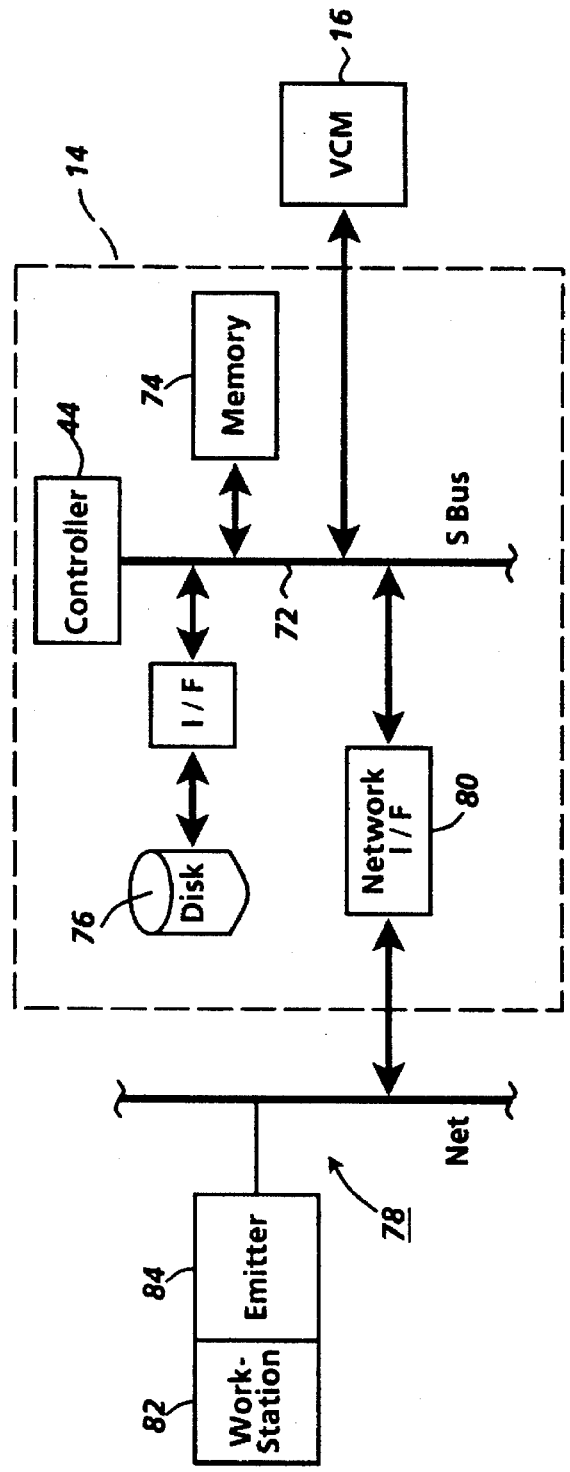
FIG. 5 is a block diagram of a network controller for the printing machine of FIG. 1.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below The DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 4:
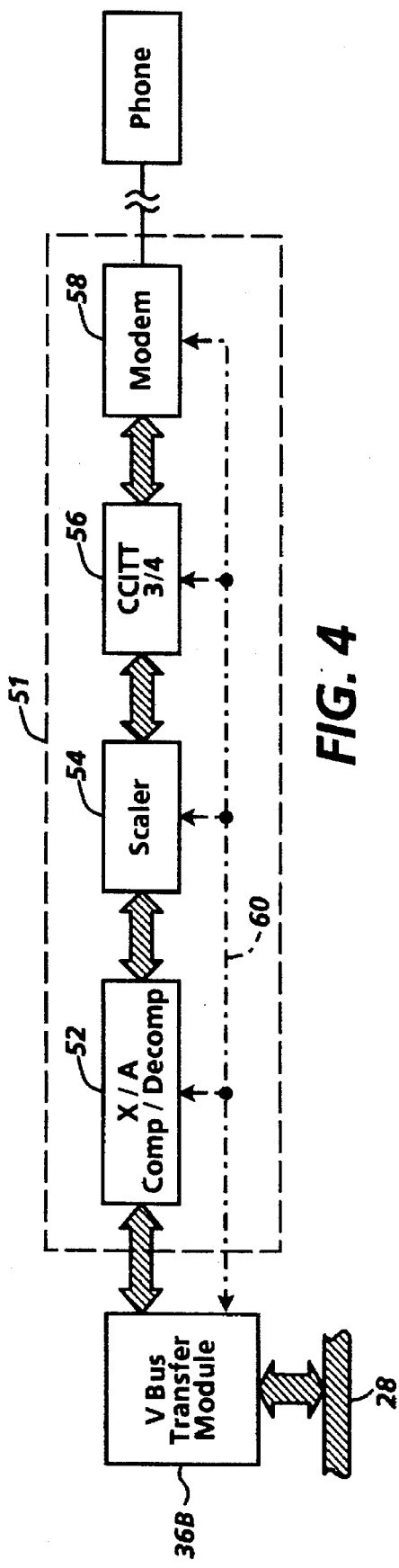
FIG. 4 is a block diagram of a facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 2, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus with a suitable interface chip. As further shown in FIG. 5, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1990

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Figure 19:
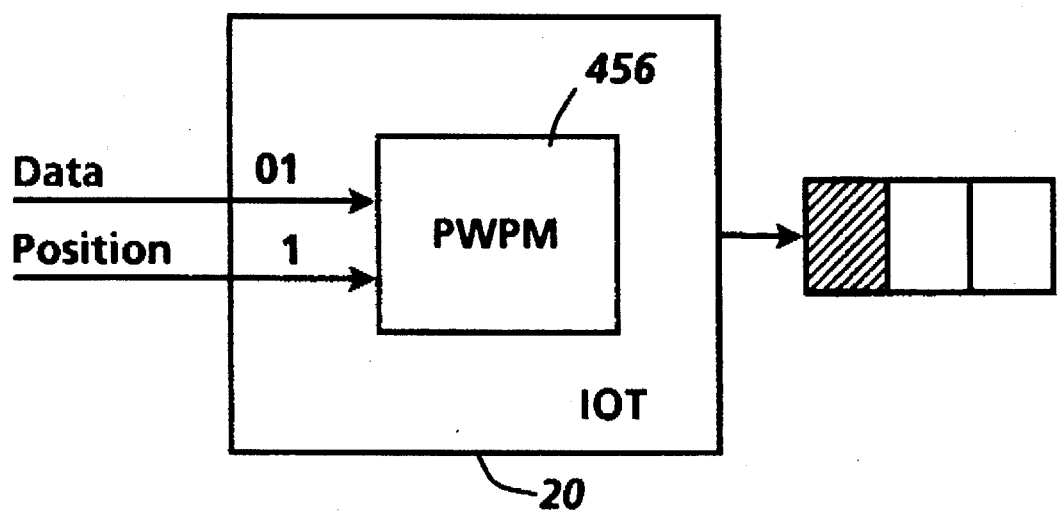
FIG. 19 is a schematic representation of a printer with a pulse width position modulator, the pulse width position modulator being responsive to encoded/reconstructed data generated in accordance with the present technique.

Referring to FIGS. 2, 3 and 5, further discussion regarding DMA transfer of each of the transfer modules 36 is provided. In particular, in one example, the images of a job are stored in the host memory 74 as a series of blocks. Referring to FIG. 19, a series of blocks is shown as being stored in the EPC memory 24. Preferably, each block comprises a plurality of packets. In operation, one of the transfer modules 36 is provided, by the controller 44, with the beginning address of a block and the size of the block. In turn, for that block, the transfer module 36 effects a packet tranfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Referring to FIGS. 2, and 5–7, one aspect of operation of the above described printing system is discussed. In particular, FIGS. 6 and 7 relate to an advantageous manner in which the transfer modules 36 are employed to facilitate a loopback approach for image processing of jobs which are captured at a location other than the scanner 18. In the illustrated embodiment of FIG. 6, a job is captured in the network service module 14 (step 90). This is not to imply, however, that the loopback operation could not be performed, with equal facility, on a job captured at another location, such as the FAX module 48. Upon capturing the network job, it is either spooled in, for example, the SCSI disk 76 for eventual decomposition (steps 92, 94) or decomposed with the controller 44 for storage in the host memory 74 (steps 92, 96). If the process branches to step 94, a return is encountered. Accordingly, functions are performed, relative to other jobs, until the system is ready to decompose the spooled job. When it is time to decompose the spooled job, processing of the spooled job will resume at step 96.

Assuming that the job is decomposed, and image processing is required by the job, one or more transfer modules 36 are programmed, via step 98, for transferring electronic pages of the job to one or more destinations. It should be appreciated that, in one example, it may be desirable to program transfer module 36e for transferring an electronic page to the image processing section 22 and to program transfer module 36c for transferring the resulting image processed electronic page to EPC memory 24. It will be appreciated that other ones of the transfer modules could be programmed in a manner that would enhance system concurrency. For example, in the case where the image processed electronic page is transferred to EPC memory, the transfer module 36a could be programmed to spool a copy of the image processed electronic page in the SCSI disk 34.

At step 100, it is determined whether a current electronic page requires image processing. Initially, this determination would be made for a first page of the job. Assuming that the current electronic page does not require image processing, it is determined, at step 102, whether the current electronic page is to be transferred to a location other than the host memory 74. In one example, it may be desired to transfer the electronic page to the EPC memory 24 for eventual output (at, for example, the printer 20 or the facsimile device 51) or storage (in the SCSI disk 34). If the current page is to be transferred, then step 104 is executed, otherwise, the process proceeds to step 106 (FIG. 7) so that further electronic pages can be, if necessary, image processed and/or transferred (step 107).

Assuming that the current electronic page is to be image processed (FIG. 6), the image processing section 22 is set up, via step 108, to perform one or more selected image processing operations on a selected electronic page. In response to setting up appropriate image processing control registers, at step 108, the current electronic page is transferred, with the transfer module 36e, to the image processing section 22 (step 110) and, at step 112, one or more programmed image processing operations are performed on the current electronic page. Upon completion of the image processing operations, it is determined, at step 114, whether the image processed electronic page should be transferred to storage (e.g. EPC memory 24 or host memory 74) or an output device (e.g. printer 20 or FAX module 48).

If the current electronic page is to be stored, then a decision is made, at step 118 (FIG. 7), as to whether the current electronic page is to be stored. For the most part, the printing system compresses the current electronic page, to promote efficient storage, unless a print of the current electronic page is to be produced. Indeed, even when printing a job, the corresponding electronic pages are often compressed and then stored in the EPC memory for "print readiness". With this approach a selected number of job copies can be printed without capturing/processing the job more than once. In some instances, however, it may be desirable to produce a single print from a current electronic job. For example, a single print may be produced for purposes of proofing. If compression is required, then the current electronic page is passed to the compressor 62, at step 120, otherwise, a storage destination of the current electronic page is determined directly, at step 122.

Figure 6:
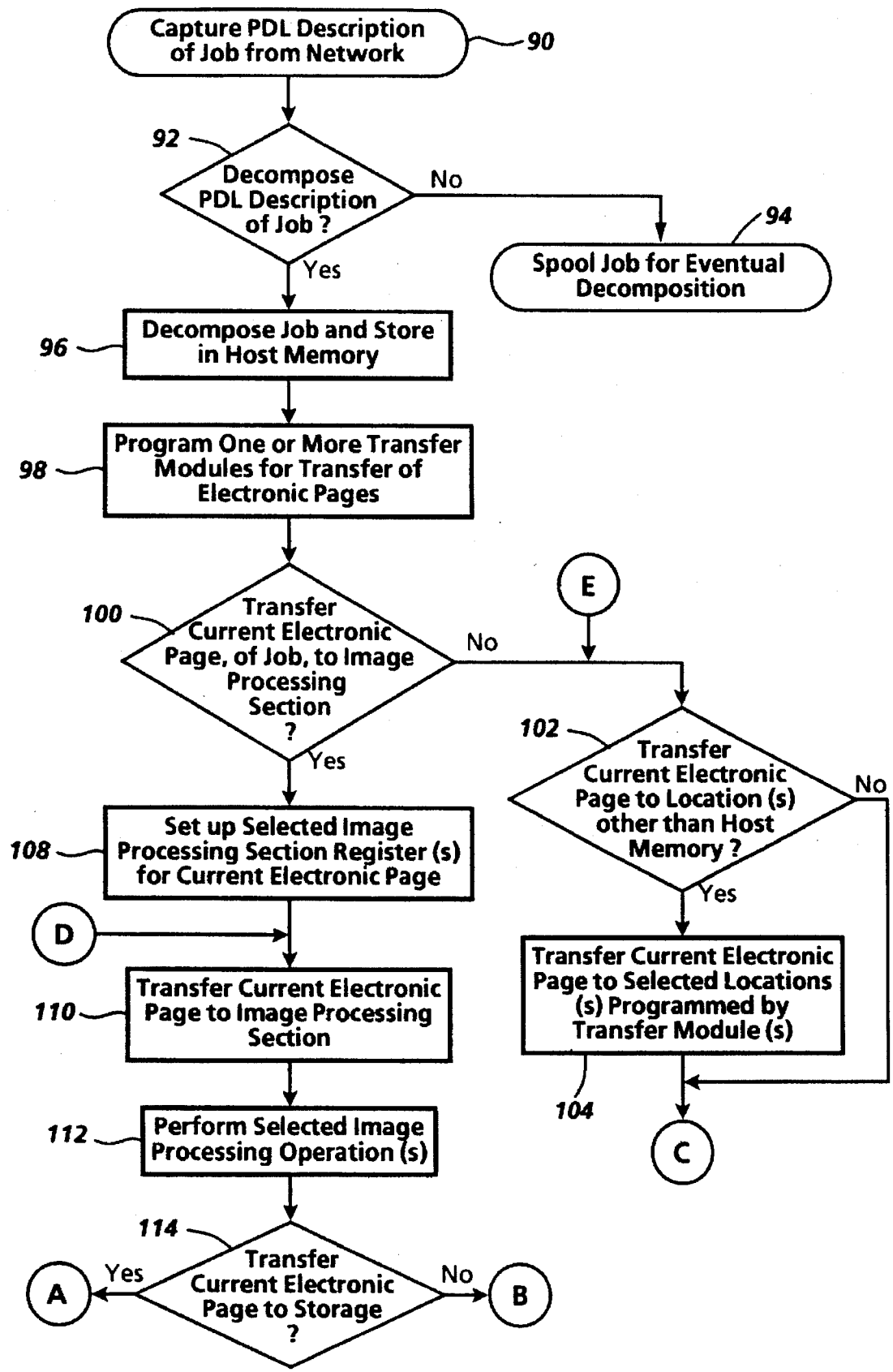
FIGS. 6 and 7 represent a flow diagram for a loopback image processing method of the present invention.
Figure 7:
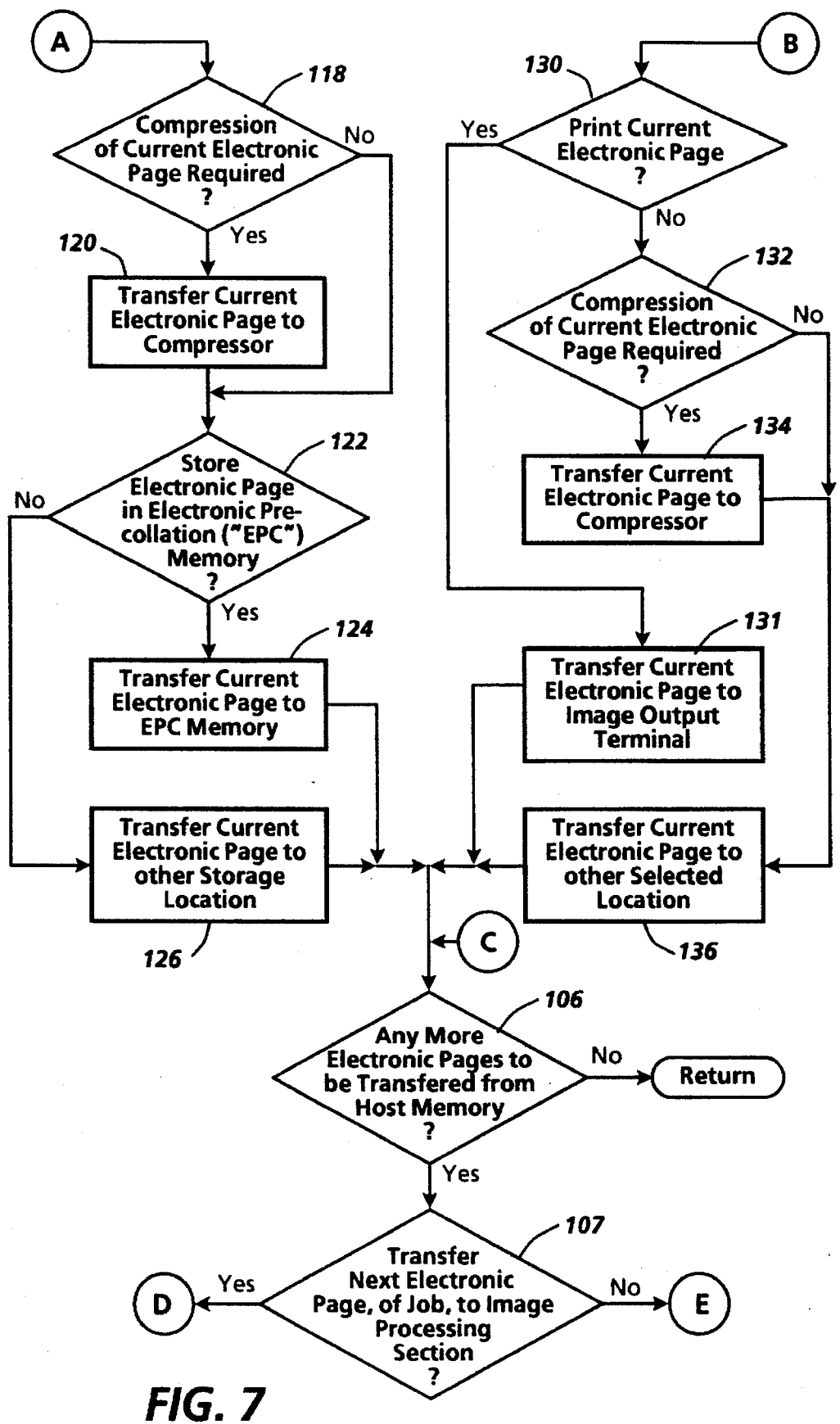

If the decision at step 122 is in the positive, then the process proceeds to step 124, where the current electronic page is transferred to the EPC memory, and then to step 106, where a check is made to determine if any more electronic pages exist, for the job, in the host memory 74. if the decision at step 122 is in the negative, then the current electronic page is transferred to a designated storage location other than the EPC memory (step 126), such as the host memory 74, and the process proceeds to step 106. Assuming that the current electronic page is not going to be stored, it is determined, at step 130, whether the current electronic page is to be printed. If the current electronic page is to be printed, then the same is transferred to the printer 20 for marking (step 131), otherwise, it is determined, at step 132, whether the current electronic page is to be compressed. As mentioned above, if an electronic page is not printed, then, typically, it is compressed. Assuming compression is required, the process proceeds to step 134, otherwise a transfer of the current electronic page to another location is performed directly at step 136. In either case, the process proceeds eventually to step 106. If all of the electronic pages in the host memory have been read, then the routine of FIGS. 6 and 7 is ended through a return. If, on the other hand, more pages need be transferred, then the process proceeds to step 107 where a next current electronic page is either processed or, if necessary, transferred away from host memory to another storage location or an output device.

Figure 8:
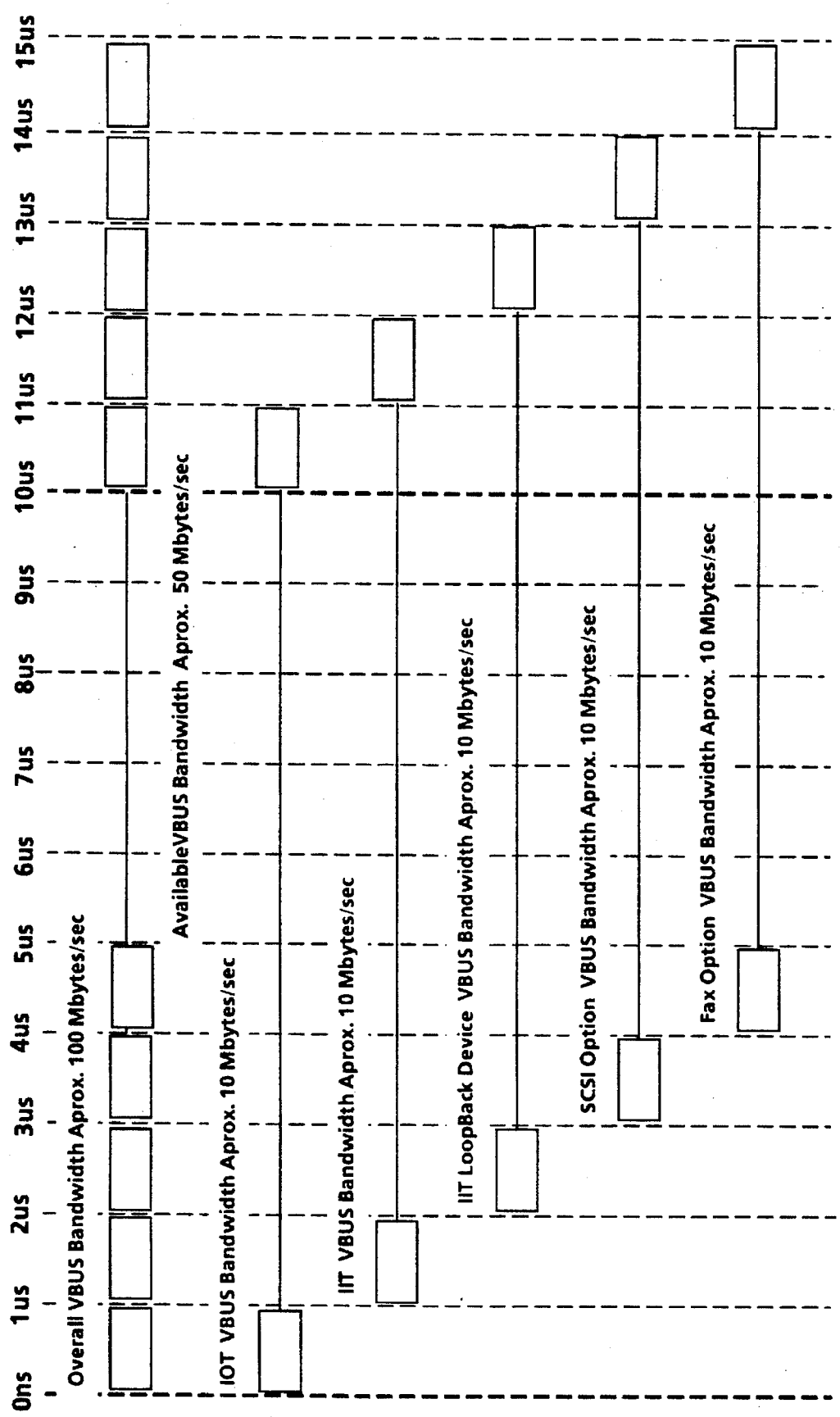
FIG. 8 is a timing diagram depicting a manner in which a plurality of bus masters can share a video bus, of the printing machine of FIG. 1, in a time-shared manner.

Referring to FIG. 8, another aspect of operation of the above described printing system is discussed. The illustrated timing diagram of FIG. 8 shows how each bus master on the Vbus 28 shares the available bandwidth by time multiplexing the high speed bus and sending a fragment of a job or image file every time the bus master has access to the bus. Each time one of the bus masters receives a grant of the bus, via the arbiter 70, the bus master sends a packet of information on the bus while it continues to receive data from its respective interface. Packet sizes are programmable in sizes ranging from 4 bytes to 64 bytes per packet. In the example of FIG. 8, each device requires approximately 10 Mbytes/sec of bandwidth from the Vbus. When bus masters, each having a bandwidth requirement of 10 Mbytes/sec, are concurrently using the bus, the total bandwidth used on the bus is 50 Mbytes/sec. This leaves approximately 50 Mbytes/sec available bandwidth left on the bus. The remaining bus bandwidth can be used by any other bus masters wishing to transfer data on the Vbus. The large amount of available bandwidth also eliminates any contention problems which can arise with an over-utilized bus.

Referring to both FIGS. 2 and 8, it will be appreciated that the above-described multiplexing permits at least two jobs to be processed within a relatively brief time interval. For all intents and purposes, it would appear to a printing system user that the jobs were being operated on simultaneously. More specifically, a first job could be stored in the EPC memory 24 and a second job could be stored in the host memory 74. As soon as an image data packet of the second job is buffered in the packet buffer of transfer module 36e, a packet of image data from the first job can be delivered to the printer 20, by use of transfer module 36d, concurrently with image data being delivered to the image processing section 22. As will be further appreciated, by reference to FIG. 8, copies of packets of the first job could be delivered to various other bus masters in a time-sharing or multiplexed fashion.

Referring to FIGS. 2, 5, 9 and 10, an image processing technique, appropriate for use with printing system 10, is discussed. In the illustrated embodiment of FIG. 9, input image data, for a given input image, is, at step 400, inputted to image processing section 22 (FIG. 2). In one mode of operation, the inputted image data is obtained at the scanner 18. More particularly, a document is scanned and $2^x$ bits of gray data is provided in the form of a bitstream. In turn, the gray data is thresholded so that the image is expressed as n bits of data where n is less than $2^x$. In one example, the given input image is processed at 600×3 spi so that n=3 and a resulting output, with a resolution of 1800×1 spi, can be obtained. It has been found, however, as explained in further detail below, that, for this example, storage can be optimized and an output resolution of 1800×1 spi obtained even when the value of n is less than 3. As will appear, the present technique is applicable for inputs and outputs of various resolutions, and image data can be obtained from a wide range of input sources without affecting the concept underlying the disclosed embodiment.

In accordance with the preferred technique, at step 402, image data is encoded. Referring to the illustrated embodiment of FIG. 11, n bits are described with n–m bits where each m bit represents, as explained in further detail below, positional information. In one example, three bits are described generally with two bits, or, stated alternatively, at one of four levels. It follows from the illustration of FIG. 11, that in a high addressability approach, each 600×2 pixel can be encoded so as to simulate 1800×1 data. Normally, three bits would be required to describe three pixels at 1800×1 spi, but in the illustrated scheme of FIG. 11, only two bits, designated by the term "intensity", are required to describe a group of three 1800×1 spi pixels. That is a 600×2 spi pixel, with an intensity of 00, is equivalent to three white pixels at 1800×1 output, a 600×2 spi pixel, with an intensity of 01, is equivalent to one black pixel and two white pixels, at 1800×1 spi, and so on.

Figures 11, 12:
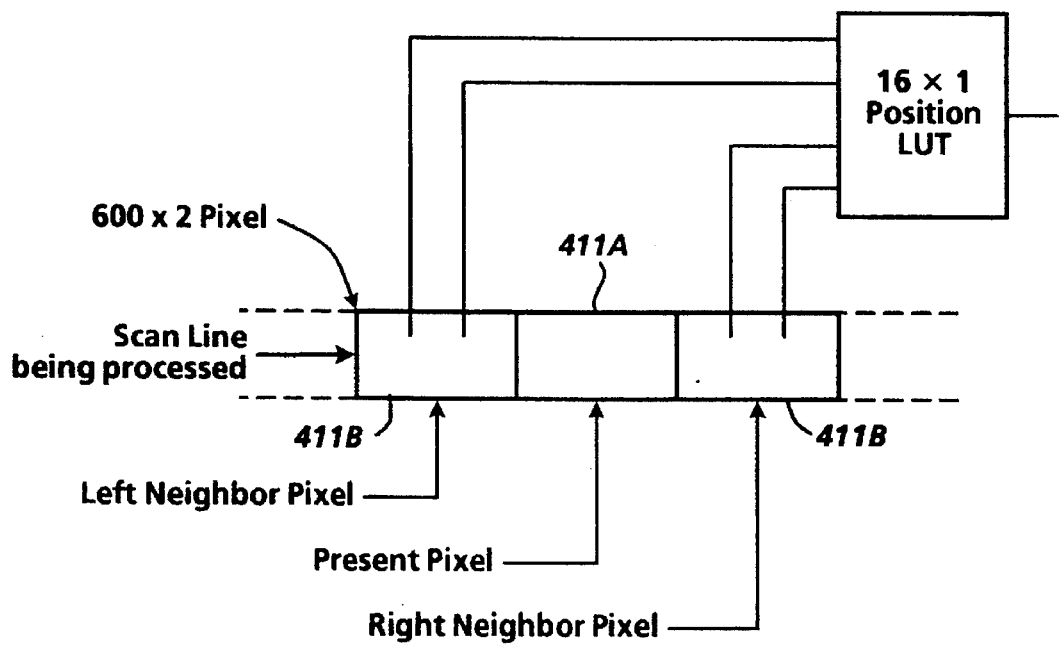
FIG. 11 is a schematic representation depicting an encoding scheme of the present technique.
FIG. 12 is a schematic representation of an analyzing circuit used in a reconstruction arrangement of the present technique.

It should be recognized, nonetheless that certain image-related information is lost by the encoding scheme of FIG. 11 in that the pixels labeled as "GRAY1" and "GRAY2" cannot be fully described by just two bits. In other words, use of only two bits does not indicate whether the black pixel is left justified, right justified or center justified. Effectively, as explained in further detail below, this information can be provided, via a reconstruction step.

Referring again to FIGS. 2 and 9, preferably, an encoded bitstream is compressed, with compressor 62 (step 404) and then stored in EPC memory 24 (step 406). The compressed, encoded bitstream is, via step 408, held in the EPC memory until it is either copied to disk 34 (step not shown) or outputted to an appropriate output device, such as the printer 20. When it is time to output the stored encoded bitstream, decompression is effected, via step 410, with the decompressor 64. As will be appreciated from the discussion above, movement of data between the image processing section, compressor, EPC memory and the decompressor, is facilitated with the transfer modules 36.

In anticipation of outputting the image data, the corresponding bitstream is analyzed, per step 412, with a bitstream analyzing arrangement. Referring generally to FIGS. 12–16, an example of a reconstruction scheme, with a bitstream analyzer is illustrated. It will be appreciated by those skilled in the art that operation of the bitstream analyzer can be implemented with a suitable processor. Moreover, the image assumes the form of a bitmap with a plurality of scanlines.

Figure 9:
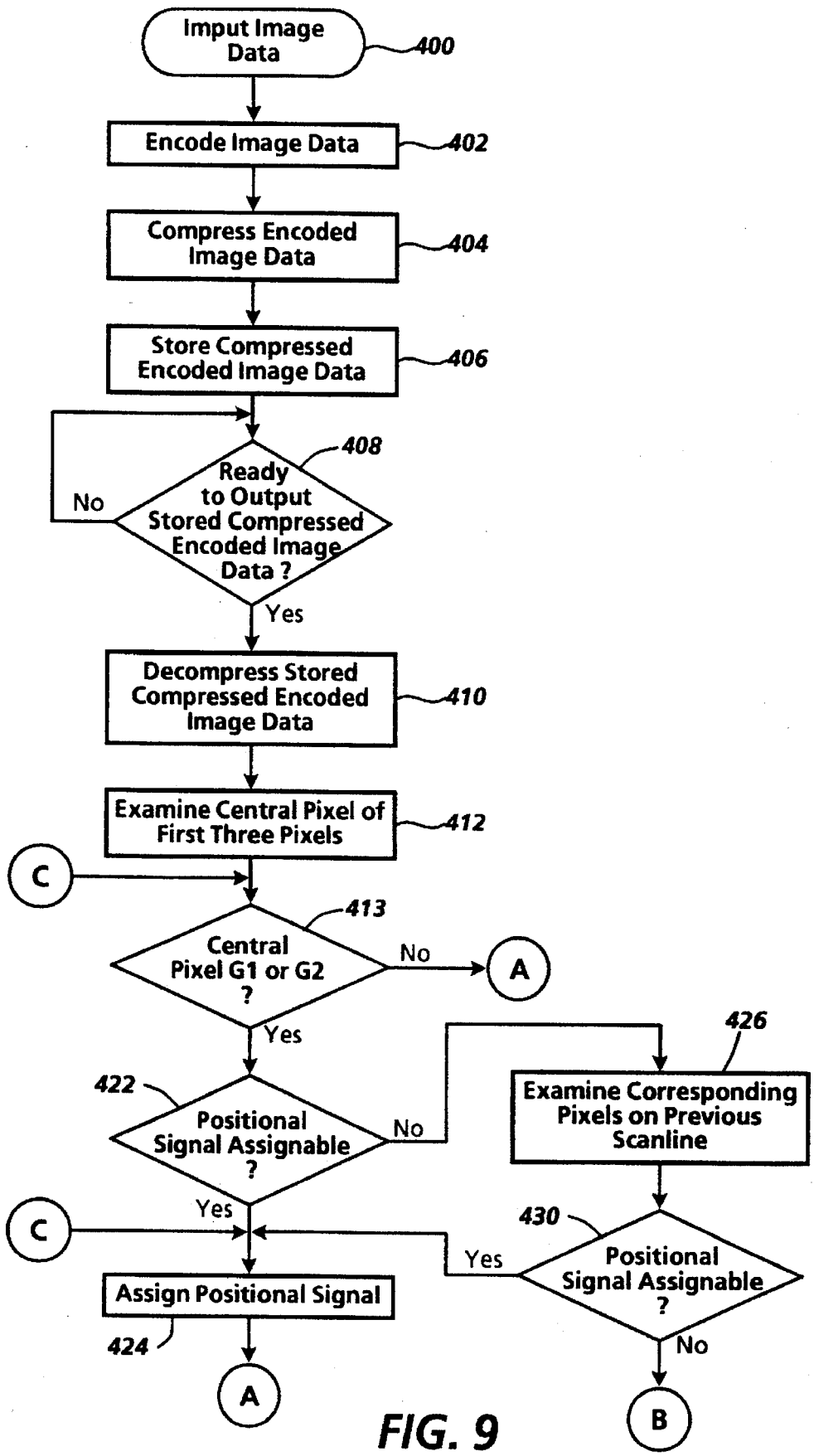
FIGS. 9 and 10 represent a flow diagram depicting a technique for encoding and reconstructing an input image.
Figure 10:
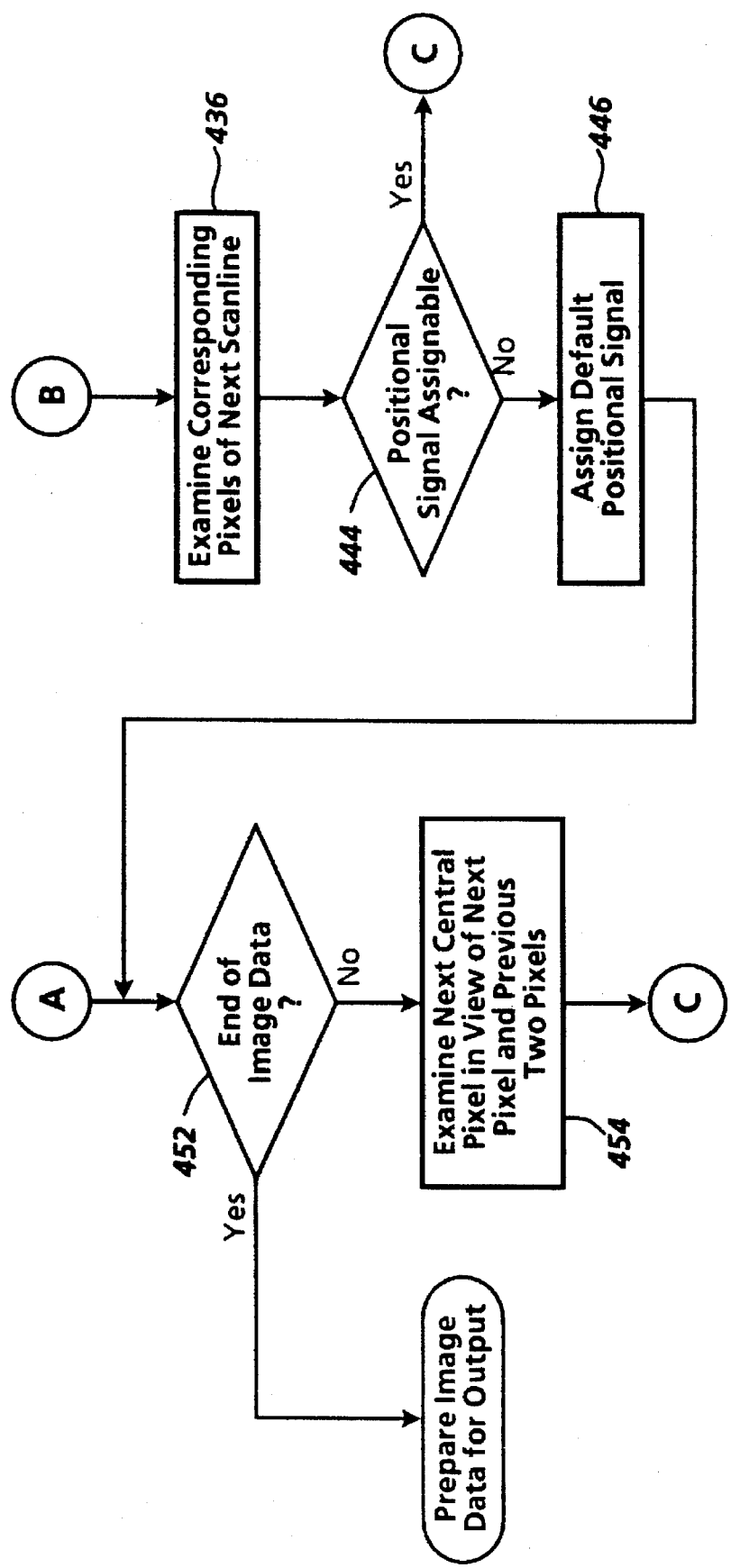

Referring to FIGS. 9, 11 and 12, when a present or central pixel 411a corresponds with three white or three black pixels, then the central pixel can be described completely with two bits. In the case of an all white or all black central pixel 411a, the process proceeds to step 452 (FIG. 10). When, however, the central pixel is GRAY1 (i.e. "G1") or GRAY2 (i.e. "G2") pixel (step 413), then the central pixel cannot be described with two bits.

Referring specifically to FIG. 12, a preferred approach for interpreting G1 and G2 central pixels is discussed. In the preferred approach, each pixel for a given input bitstream is read for purposes of comparing bit pairs representative of "neighboring" or "framing" pixels with the entries of a 16×1 look-up table. More particularly, each central pixel 411a is disposed intermediate of a left neighbor pixel 411b and a right neighbor pixel 411c. In one example of operation, the respective bit pairs of the left neighbor and the right neighbor, for each G1 or G2 pixel, are compared to each of sixteen bit pairs in the look-up table 415 of FIG. 13. In turn, a match is obtained and a corresponding positional signal or value is assigned to the central or present pixel.

The positional signal of the illustrated look-up table facilitates a reconstruction of the bit discarded during the encoding of the image data. More particularly, it is known that, in a typical black and white image, black pixels tend to group together. Accordingly, this knowledge can be used in reconstructing the present pixel of FIG. 11 when that pixel assumes the form of the G1 pixel or the G2 pixel. It stands to reason that the gray part of a G1 or G2 central pixel would tend to associate with the neighboring pixel having the greatest intensity.

Figure 14A:
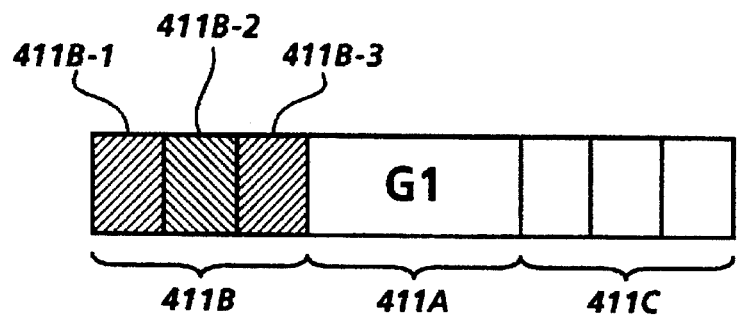
FIGS. 14A and 14B are schematic, partial representations of scanlines, the schematic, partial representations being employed to illustrate one aspect of the present technique.
Figure 14B:
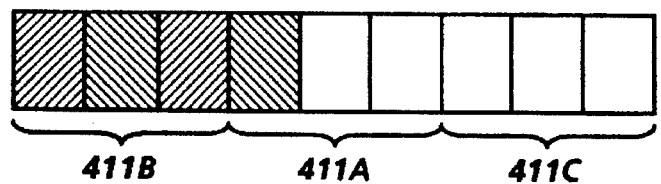

This approach can be best understood by reference to an example of FIGS. 14A and 14B. The pixel 411b, which has an intensity of 11, is referred to, in the look-up table 415 (FIG. 13), as "B" and the pixel 411c, which has an intensity of 00, is referred to, in the look-up table, as "W". As indicated by the look-up table, the position of the gray pixel in the present pixel is left justified (FIG. 11) so that the one black pixel of the pixel 411a is grouped with the black pixels 411*b*-1, 411*b*-2 and 411*b*-3 of pixel 411*b*. It will be appreciated that while the current methodology groups black pixels, in another approach, white pixels could be grouped together.

The approach discussed above assumes that the left neighbor pixel and the right neighbor pixel have different intensities. When this assumption holds true, the process proceeds to step 422 (FIG. 9), and then step 424 where a positional signal of "0" or "1" is assigned to the central or present pixel 411. It should be appreciated that a single bit cannot designate each case for a GRAY1 pixel in that an 1800×1 pixel (FIG. 11) can assume one of three positions. The present technique assumes that the 1800×1 pixel is either left or right justified. In another embodiment, center justification would be accommodated for by using two bits to describe the positional signal. It will be recognized that use of two bits to describe justification provides additional flexibility to the current technique.

Figure 15:
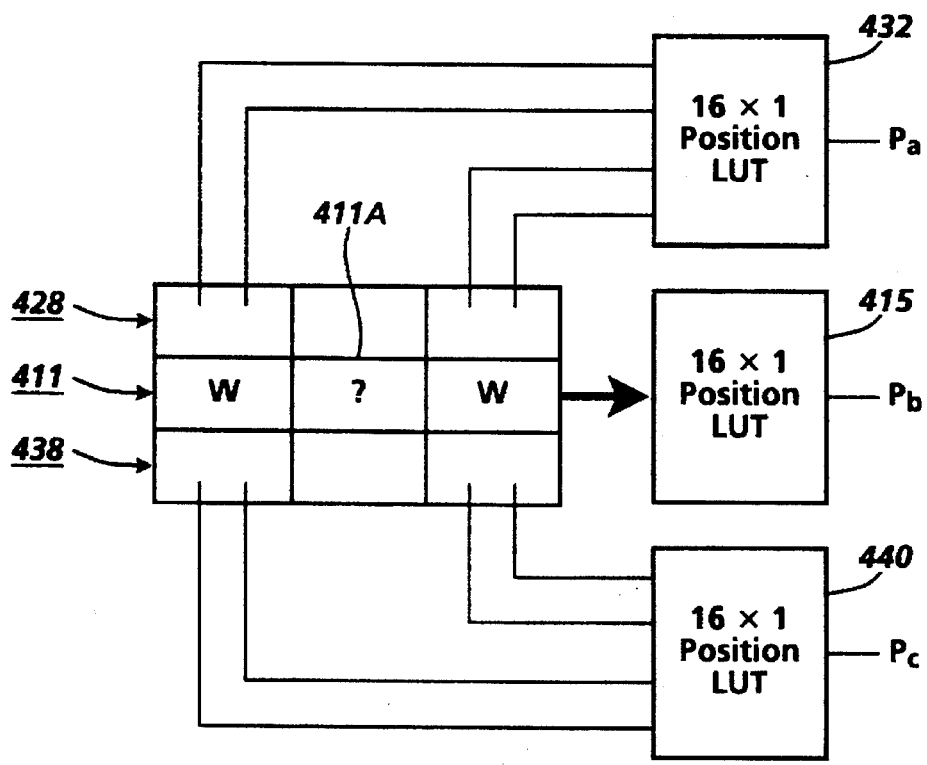
FIG. 15 is a schematic representation of another analyzing circuit used in conjunction with one aspect of the present technique.
Figure 16:
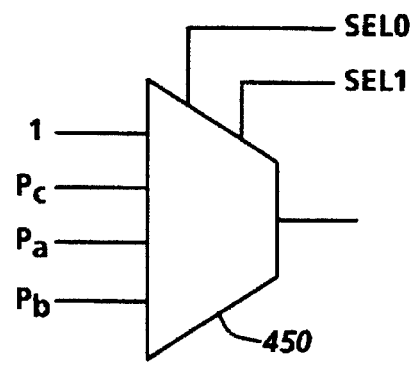
FIG. 16 is a schematic representation of a multiplexing arrangement used in conjunction with the analyzing circuit of FIG. 15.
Figure 17:
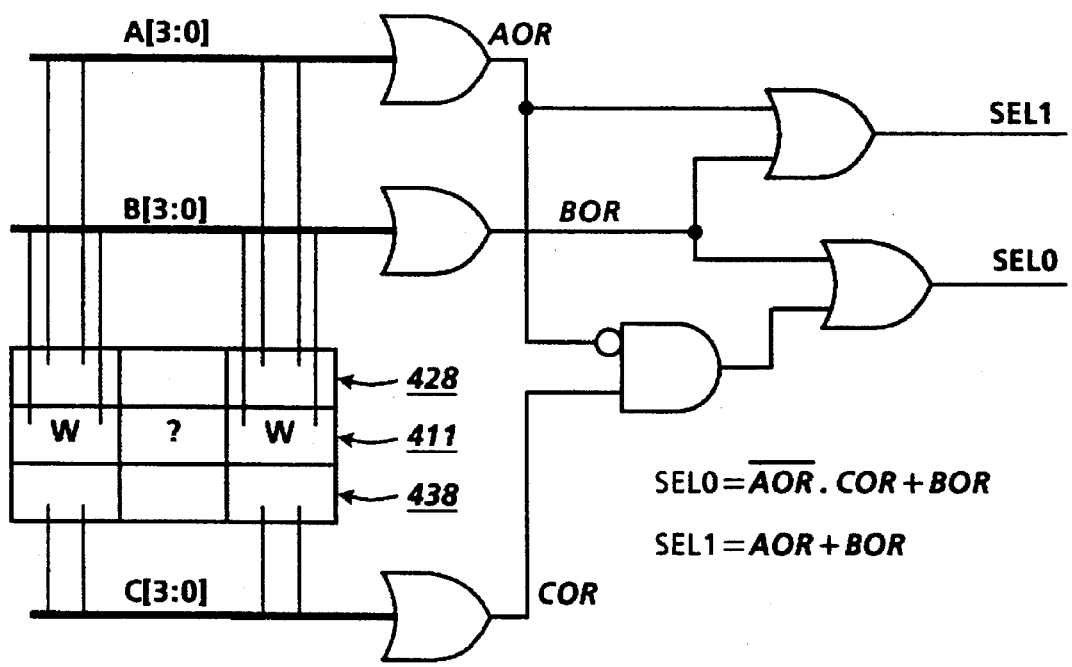
FIG. 17 is a schematic representation of a select circuit used to generate the select signals for the multiplexing arrangement of FIG. 16.

Referring to FIG. 13, for the case in which the left neighbor pixel/right neighbor pixel pair is W—W, an ambiguity exists because there is no reason, based on a single scanline analysis, for justifying the gray part of the present pixel to the left or to the right. In the illustrated embodiment of FIG. 13, the positional signal or value of the the four cases is assigned on the basis of empirical observations regarding image data output. Referring generally to FIGS. 15–17, an approach for optimizing the present technique, when the left neighbor pixel/right neighbor pixel pair is W—W, is discussed.

Referring conjunctively to FIGS. 9 and 15, when the present or central pixel 411*a* of a scanline 411 being processed cannot be assigned a positional signal, because the respective intensities of the left neighbor pixel and the right neighbor pixel are white (step 426), a corresponding two pixels of a previous scanline 428 are examined (step 430) with the bitstream analyzer. To effect the examination, a second 16×1 look-up table 432, identical to the one of FIGS. 13 and 15, namely look-up table 415, is employed. If a match is found in the second look-up table, and the match does not relate to a bit pair in which the intensities are the same (e.g. the intensities are W—W), then a positional signal is obtained in the same manner as described for step 424.

Referring to FIGS. 10 and 15, if the positional signal for the present pixel cannot be designated, by reference to the previous scanline, because the respective intensities of the corresponding pixels of the previous scanline are, for example, both white, then, via step 436, the intensities of a corresponding two pixels of a next scanline 438 are examined with a third look-up table 440, which third look-up table is identical in content to the first look-up table 434. If a match is found in the third look-up table, and the match does not relate to a bit pair in which the intensities are each white, then a positional signal is obtained in the same manner as described for step 424. If a match cannot be made on the basis of examining any of the scanlines 425, 428 or 438, then, via steps 444, 446, default positional value is, via step 446, assigned.

In the illustrated embodiment of FIGS. 9, 10 and 15, the three scanlines are analyzed simultaneously to determine what the positional signal of the present pixel should be. Preferably, one of a plurality of output signals from the look-up tables 415, 432 and 440 is then chosen with a 4 to 1 multiplexer 450 (FIG. 16), which multiplexer is controlled by selected signals designated as "SEL0" and SEL1". Referring to FIG. 17, an implementation for generating the select signals is shown. Referring conjunctively to FIGS. 16 and 17, when the respective signals of SEL0 and SEL1 are 1 and 1, the positional signal of look-up table 415 is permitted to pass through a multiplexer 450. When the respective signals of SEL0 and SEL1 are 1 and 0, the positional signal of look-up table 432 is permitted to pass through the multiplexer 450. When the respective signals of SEL0 and SEL1 are 0 and 1, the positional signal of look-up table 440 is permitted to pass through the multiplexer 450. In a default case, namely when the respective signals of SEL0 and SEL1 are 0 and 0, a preassigned signal, e.g. a 1, is permitted to pass through the multiplexer 450. It will be appreciated that the preassigned signal may be assigned, for example, on the basis of empirical data.

Figure 18:
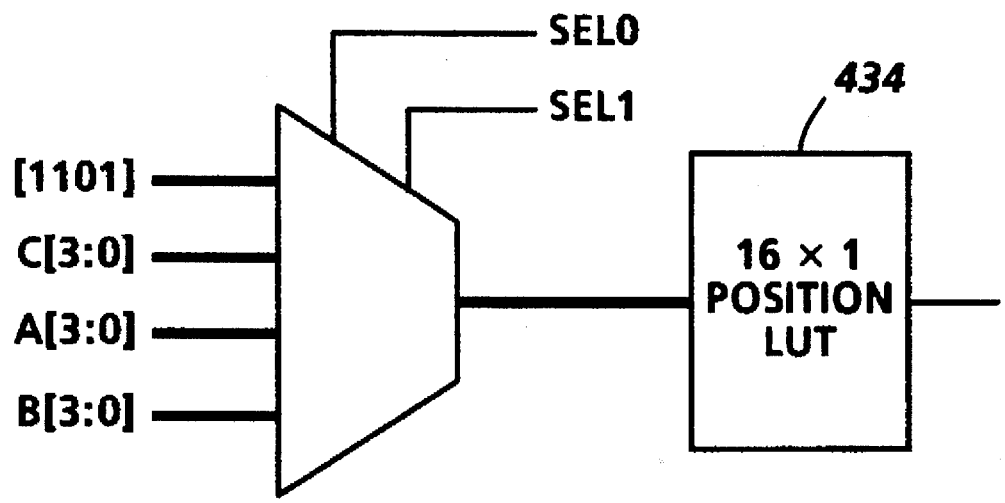
FIG. 18 is schematic representation of another multiplexing arrangement usable with the analyzing circuit of FIG. 15.

Referring to FIG. 18, in another embodiment, the position signal for the present pixel 423 could be obtained through the use of an arrangement with just one of the look-up tables 415, 434 or 440 and the multiplexer 450. More particularly, in this other embodiment, the bits corresponding to each of the framing or neighboring pixels of scanlines 425, 428 and 438, along with a suitable set of default bits, is transmitted to the four inputs of the multiplexer 450. Through use of appropriate select signals, from the select circuit of FIG. 17, one of the bit sets is permitted to pass through the multiplexer, and, in turn, that bit set is processed with the look-up table.

Referring again to FIG. 10, subsequent to the assignment of each positional signal, a check is performed, at step 352, to determine if all of the image data for a given input image has been processed. If an end to the image data has not been reached, then the neighboring pixels of another central pixel are examined (step 454) and the process returns to step 424. If, on the other hand, all of the image data for the given input image has been processed, then the image data of the given input image is prepared for output.

Referring to FIG. 19, in one example of output, namely marking, the image data is transmitted to the printer 20, the printer 20 including a component 456 referred to as a pulse width position modulator ("PWPM"). As is known, the PWPM serves to control the operation of a raster output scanner ("ROS") as a function of digital input provided thereto. In the illustrated embodiment of FIG. 19, the PWPM is responsive to the representative bits of a given pixel and, where appropriate, a positional signal so that three output pixels are reproduced by the ROS on the basis of the two or three bits provided to the PWPM. In one example, as shown in FIG. 19, when the input data is a 01 and the positional signal is 1, the output includes two white pixels and one black pixel with the black pixel being left justified.

Numerous features of the above-disclosed embodiment will be appreciated by those skilled in the art:

First, the present technique includes an encoding approach which permits m out of every n bits to be discarded from image data of an input image where the m bits represent "positional" bits and n–m bits correspond with $2^{n-m}$ intensities. This discarding of bits results in a decrease of storage demand. In one example a storage saving of up to 33% is achieved. In some cases, such as the ones in which a pixel is all white or all black, the discarded bit will not be missed. That is, in some instances, it is possible to describe, completely, the output states of n bits with just n–m bits. In any event, "lost" information provided by the discarded bits is, where necessary, reconstructed, so there is little or no loss in image output quality.

Reconstruction is preferably accomplished by examining each pixel in an image and assigning a positional signal, when appropriate. Such reconstruction is believed to be necessary when the position of one or two black pixels, disposed in a group of three pixels cannot be positioned or justified on the basis of two bits worth of image information. Due to the assignment of the positional signals, virtually all of the information, related to the input image, can be recaptured for output.

Second, each positional signal is assigned with a high degree of accuracy. In one example, when a pixel being examined is framed by two pixels of the same intensity, e.g. white pixels, corresponding pixels from adjacent scanlines are analyzed to optimize eventual justification of one or more black pixels. Additionally, the examined pixels of the multiple scanlines can be analyzed in parallel so that the best suited positional signal can be obtained within a relatively short time interval.

Finally, relatively little hardware and software are required to implement the present technique. More particularly, each time a bit is discarded, an efficient encoding scheme is employed to compensate for much of the apparent loss in information. Moreover, pursuant to output of the encoded data, use of a simple, yet intuitive algorithm provides for the assignment of the positional signals. This algorithm is implemented with a minimum amount of hardware and, in one example, a suitable implementation can be achieved with relatively few logical components and a single look-up table.

What is claimed is:

1. A method of processing a job, having an input image, with a printing system having an electronic volatile memory, the job including an input image represented by image data, assuming a form of an input bit stream, the input bit stream including a plurality of first bit sets, comprising the steps of:

encoding the bit stream so that each of the first bit sets is represented by a second bit set, each of the second bit sets having less bits than each of the first bit sets, a selected number of bits in the input bit stream, corresponding to image-related information, being discarded as a result of said encoding, wherein each second bit set corresponds with a pixel having a state and the pixels are disposed in a scanline;

storing a resulting encoded bit stream in the electronic volatile memory with memory space being saved as a result of reducing a size of each of the first bit sets;

decoding the stored resulting encoded bit stream, including, analyzing, during said decoding, the stored encoded bit stream to generate positional signals, wherein said analyzing includes assigning one of the positional signals to each pixel in the scanline based on the state of at least one other pixel in the scanline;

reconstructing each second bit set in the stored encoded bit stream with the positional signals, so as to convert each second bit set to one of a plurality of third bit sets with each third bit set being substantially similar to a corresponding one of the first bit sets; and outputting an image representation of the reconstructed bit stream, the outputted image including at least a part of the discarded, image-related information.

2. The method of claim 1, wherein said analyzing step includes:

for a first pixel disposed between a second pixel and a third pixel assigning one of the positional signals to the first pixel based on the respective states of the second and third pixels.

3. The method of claim 2, in which the state of the second pixel is different than the state of the third pixel, further comprising the step of providing a look-up table, in a second electronic memory, the look-up table including a plurality of state pairs respectively mapped to one of plural positional signals, and wherein:

said examining step includes matching the respective states of the second and third pixels with one of the pixel pairs in the look-up table to obtain a corresponding one of the plural positional signals; and said assigning step includes assigning the corresponding one of the plural positional signals as the one positional signal.

4. The method of claim 2, in which the state of the second pixel is the same as the state of the third pixel, wherein said analyzing step includes:

for a second selected scanline with a fourth pixel disposed between a fifth pixel and a sixth pixel, examining the respective states of the fifth and sixth pixels; and assigning one of the positional signals to the first pixel when the state of the fifth pixel is different than that of the sixth pixel.

5. The method of claim 4, in which the state of the fifth pixel is different than the state of the sixth pixel, further comprising the step of providing a look-up table, in a second electronic memory, the look-up table including a plurality of state pairs respectively mapped to one of plural positional signals, and wherein:

said examining step includes matching the respective states of the fifth and sixth pixels with one of the pixel pairs in the look-up table to obtain a corresponding one of the plural positional signals; and said assigning step includes assigning the corresponding one of the plural positional signals as the one positional signal.

6. The method of claim 1, wherein said outputting step comprises printing the image, on a substrate, with a print engine.

7. The method of claim 1, wherein said encoding step includes encoding the bit stream with an image processing device.

8. The method of claim 7, in which the image processing device is part of a document scanning device, further comprising the step of obtaining the input image by electronically reading at part of a document.

9. A printing system for processing an input image represented by image data, the image data assuming a form of an input bit stream, the input bit stream including a plurality of first bit sets, comprising:

an encoder for encoding the input bit stream so that each of the first bit sets is represented by a second bit set, each of the second bit sets having less bits than each of the first bit sets, a selected number of bits in the input bit stream, corresponding to image-related information, being discarded as a result of the encoding, wherein each second bit set corresponds with a pixel having a state and the pixels are disposed in a scanline;

electronic volatile memory for storing a resulting encoded bit stream, wherein memory space, in the electronic volatile memory is saved as a result of reducing a size of each of the first bit sets;

a decoding system for decoding the stored resulting encoded bit stream, including, a bit stream analyzer for analyzing the stored encoded bit stream, during decoding thereof, to generate positional signals, wherein said bit stream analyzer assigns one of the positional signals to each pixel in the scanline based on the state of at least one other pixel in the scanline;

a reconstruction circuit for reconstructing each second bit set in the stored encoded bit stream with the positional signals, so as to convert each second bit set to one of a plurality of third bit sets with each third bit set being substantially similar to a corresponding one of the first bit sets; and an output device for outputting an image representation of the reconstructed bit stream, the outputted image including at least a part of the discarded, image-related information.

10. The printing system of claim 9, wherein, for a first pixel disposed between a second pixel and a third pixel, one of the positional signals is assigned to the first pixel based on the respective states of the second and third pixels.

11. The printing system of claim 10, in which the state of the second pixel is different than the state of the third pixel, wherein said bitstream analyzer includes a look-up table, in a second electronic memory, the look-up table including a plurality of state pairs respectively mapped to one of plural positional signals, and wherein the respective states of the second and third pixels are matched with one of the state pairs in the look-up table to obtain a corresponding one of the plural positional signals and the corresponding one of the plural positional signals is assigned as the one positional signal.

12. The printing system of claim 10, in which the state of the second pixel is the same as the state of the third pixel, wherein, for a second selected scanline with a fourth pixel disposed between a fifth pixel and a sixth pixel, the respective states of the fifth and sixth pixels are examined and, when the state of the fifth pixel is different from the state of the sixth pixel, one of the positional signals is assigned to the first pixel.

13. The printing system of claim 12, in which the state of the fifth pixel is different than the state of the sixth pixel, wherein said bit stream analyzer includes a look-up table, in a second electronic memory, the look-up table including a plurality of state pairs respectively mapped to one of plural positional signals, and wherein the respective states of the fifth and sixth pixels are matched with one of the pixel pairs in the look-up table to obtain a corresponding one of the plural positional signals and the corresponding one of the plural positional signals is assigned as the one positional signal.

14. The printing system of claim 9, wherein said output device comprises a print engine for producing a print representative of the input image.

15. The printing system of claim 14, wherein a document is electronically read, with a scanner, to generate the input image.

16. An apparatus for processing an input image represented by image data, the image data assuming a form of an input bit stream, the input bit stream including a plurality of first bit sets, comprising:

a device for processing the input bit stream in such a manner that each of the first bit sets is represented by a second bit set, each of the second bit sets having less bits than each of the first bit sets, a selected number of bits in the input bit stream, corresponding to image-related information, being discarded as a result of the encoding, wherein each second bit set corresponds with a pixel having a state and the pixels are disposed in a scanline;

electronic volatile memory for storing a resulting encoded bit stream, wherein memory space, in the electronic volatile memory is saved as a result of reducing a size of each of the first bit sets;

a decoding system for decoding the stored resulting encoded bit stream, including, a bit stream analyzer for analyzing the stored encoded bit stream, during decoding thereof, to generate positional signals, wherein said bit stream analyzer assigns one of the positional signals to each pixel in the scanline based on the state of at least one other pixel in the scanline;

a reconstruction circuit for reconstructing each second bit set in the stored encoded bit stream, with the positional signals, so as to convert each second bit set to one of a plurality of third bit sets with each third bit set being substantially similar to a corresponding one of the first bit sets; and an output device for outputting an image representation of the reconstructed bit stream, the outputted image including at least a part of the discarded, image-related information.

17. The image processing apparatus of claim 16, wherein, for a first pixel disposed between a second pixel and a third pixel, one of the positional signals is assigned to the first pixel based on the respective states of the second and third pixels.

18. The image processing apparatus of claim 17, in which the state of the second pixel is different than the state of the third pixel, wherein said bitstream analyzer includes a look-up table, in a second electronic memory, the look-up table including a plurality of state pairs respectively mapped to one of plural positional signals, and wherein the respective states of the second and third pixels are matched with one of the state pairs in the look-up table to obtain a corresponding one of the plural positional signals and the corresponding one of the plural positional signals is assigned as the one positional signal.

* * * * *